(12) United States Patent
Foster et al.

(10) Patent No.: US 6,333,484 B1
(45) Date of Patent: Dec. 25, 2001

(54) WELDING SUPERALLOY ARTICLES

(75) Inventors: Michael Foster; Kevin Updegrove, both of Carson City, NV (US)

(73) Assignee: Chromalloy Gas Turbine Corporation, Hackensack, NJ (US)

( * ) Notice: Subject to any disclaimer, the term of this patent is extended or adjusted under 35 U.S.C. 154(b) by 0 days.

(21) Appl. No.: 09/527,362

(22) Filed: Mar. 17, 2000

(51) Int. Cl.[7] .............................. B23K 26/20; B23K 26/34
(52) U.S. Cl. .................................. 219/121.64; 219/76.1; 228/231; 228/232; 228/262.3
(58) Field of Search ...................... 219/121.63, 121.64, 219/121.85, 76.1; 228/222, 231, 232, 233.2, 262.3

(56) References Cited

U.S. PATENT DOCUMENTS

| | | | |
|---|---|---|---|
| 3,865,639 | * | 2/1975 | Bellot et al. ............................ 148/27 |
| 4,804,815 | | 2/1989 | Everett .............................. 219/121.6 |
| 5,106,010 | * | 4/1992 | Stueber et al. ........................ 228/232 |
| 5,240,167 | * | 8/1993 | Ferte et al. ............................ 228/231 |
| 5,319,179 | * | 6/1994 | Joecks et al. ...................... 219/76.15 |
| 5,374,319 | | 12/1994 | Stueber et al. ........................ 148/404 |
| 5,509,980 | * | 4/1996 | Lim .................................. 219/121.64 |
| 5,554,837 | | 9/1996 | Goodwater et al. ............. 219/121.63 |
| 5,785,775 | * | 7/1998 | Smashey et al. ................ 228/262.71 |
| 5,897,801 | | 4/1999 | Smashey et al. ..................... 219/137 |
| 5,900,170 | | 5/1999 | Marcin, Jr. et al. ............. 219/121.66 |
| 5,914,059 | | 6/1999 | Marcin, Jr. et al. ............. 219/121.66 |
| 6,054,687 | * | 4/2000 | Conner et al. ........................ 219/405 |
| 6,124,568 | * | 9/2000 | Broderick et al. .................... 228/232 |
| 6,168,382 | * | 1/2001 | Nolan et al. ...................... 416/213 R |

OTHER PUBLICATIONS

"Evaluation of the Weldability of the Gas Turbine Blade Materials In738LC and Rene 80" by N. Czech et al., Proceedings from Materials Solutions '97 on Joining and Repair of Gas Turbine Components, Sep. 15–18, 1997, pp. 7–10.

* cited by examiner

Primary Examiner—Samuel M. Heinrich
(74) Attorney, Agent, or Firm—Mitchell D. Bittman

(57) ABSTRACT

A process is provided for welding a nickel or cobalt based superalloy article to minimize cracking by preheating the entire weld area to a maximum ductility temperature range, maintaining such temperature during welding and solidification of the weld, raising the temperature for stress relief of the superalloy, then cooling at a rate effective to minimize gamma prime precipitation.

12 Claims, 2 Drawing Sheets

WELDING SUPERALLOY ARTICLES

The present invention relates to a process for welding superalloy articles which are difficult to weld.

As jet engine components are developed there is a continuing demand for improved capability to withstand increasingly higher temperatures due to the high temperature demands placed upon these components in the engine. Today's high pressure turbine blades and vanes are subjected to extremely adverse high temperature conditions (e.g. greater than 2000° F.). These jet engine parts may require welding processes during the manufacture of the components, or after seeing engine operations and require repair as a result of wear and cracking.

As a result of these high temperature demands these components often are manufactured from superalloys containing a gamma-prime phase. One particular problem with the gamma-prime precipitation hardenable alloys such as R'80 is the inability to weld or clad these alloys with like or similar alloys without encountering cracking and high production rejects.

Because of the welding temperatures and stresses involved, these alloys encounter shrinkage, stress cracking and the like. Due to the difficulties in welding these specific superalloys, there is a need for a process by which gamma-prime precipitation hardened alloys can be welded consistently without cracking with similar or parent metal alloys. U.S. Pat. Nos. 5,106,010 and 5,374,319 disclose such a process which preheats the weld area and region adjacent to the weld area to a ductile temperature and maintains such temperature during welding and solidification. U.S. Pat. No. 5,554,837 discloses carrying out an interactive laser welding process to maximize reproduceability and minimize rejects and waste while increasing throughput of welded components. While these processes minimize cracking in many alloys, there is still a need for improvements in the process.

SUMMARY OF THE INVENTION

Briefly, this invention provides a process for welding a nickel and/or cobalt based superalloy article, comprising preheating the entire weld area and region adjacent to the weld area of the article to a maximum ductility temperature range and maintaining such temperature during welding and solidification of the weld; and raising the temperature of the welded article to a stress relieving temperature, followed by cooling the welded article, preferably cooling at a rate of at least 100° F. (55° C.) per minute, to below the gamma prime precipitation hardening range to minimize gamma prime precipitation.

DETAILED DESCRIPTION OF THE INVENTION

This invention provides a process for welding superalloy articles, particularly gas turbine engine components including blades, vanes and rotors. The superalloys are nickel and/or cobalt based superalloys which are difficult to weld by state-of-the-art processes. These superalloys include equiax, directionally solidified and single crystal alloys of gamma-prime nickel base precipitation hardened alloys and carbide strengthened Co base alloys. Generally, the gamma-prime precipitation-strengthened superalloys contain titanium and aluminum in a combined amount of at least about 5%. Suitable superalloys include R'80, DSR'80h, R'108, IN 738 LC, R'125 Hf, DSR'142, R'N4, R'N5, Mar-M-247DS, In 792Hf, CMSX-4 and In738LC. The nominal composition of some of these superalloys is described Table 1.

In the directionally solidified (DS) alloys there are trace elements added as grain boundary strengtheners. The grain boundary strengtheners typically consist of carbides and borides, often of tungsten and tantalum. When laser welding these alloys using typical procedures there is a consistent problem with micro-crack formation at the grain boundaries. The metallurgical composition of the grain boundaries is such that they melt at a lower temperature than the remainder of the base material. If the grain boundaries then cool too rapidly they fracture. Metallurgical evaluation of weld samples has shown that parts welded using typical CO2 laser parameters suffer micro-cracks at the grain boundaries. In some cases the micro-cracks remain small. In others, they tear open and can progress completely through the new weld. Larger cracks can often be individually repaired. However, experience has shown that the more often welding is attempted on a specific part, the greater the probability of generating additional cracks. The increased probability of cracks is caused by the initial laser weld procedure, which generates micro-cracks at the grain boundaries. Even if the micro-cracks do not initially propagate, they remain present as crack initiation sites with a very high likelihood of enlarging during subsequent weld or heat treatment operations.

Figure 2:
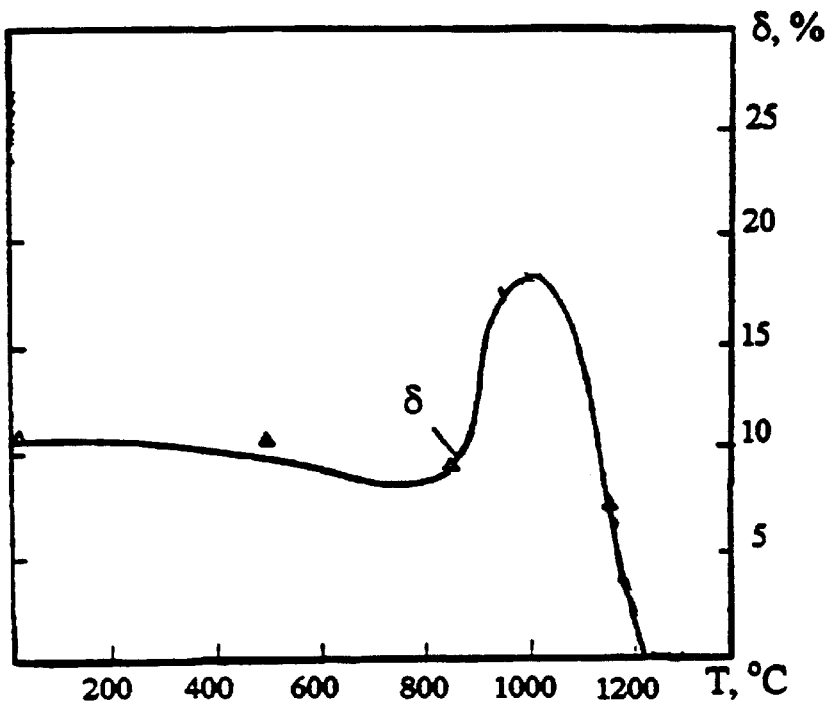
FIG. 2 is hot tensile data showing ductility ($\delta$) versus temperature for IN 738 LC.
Figure 3:
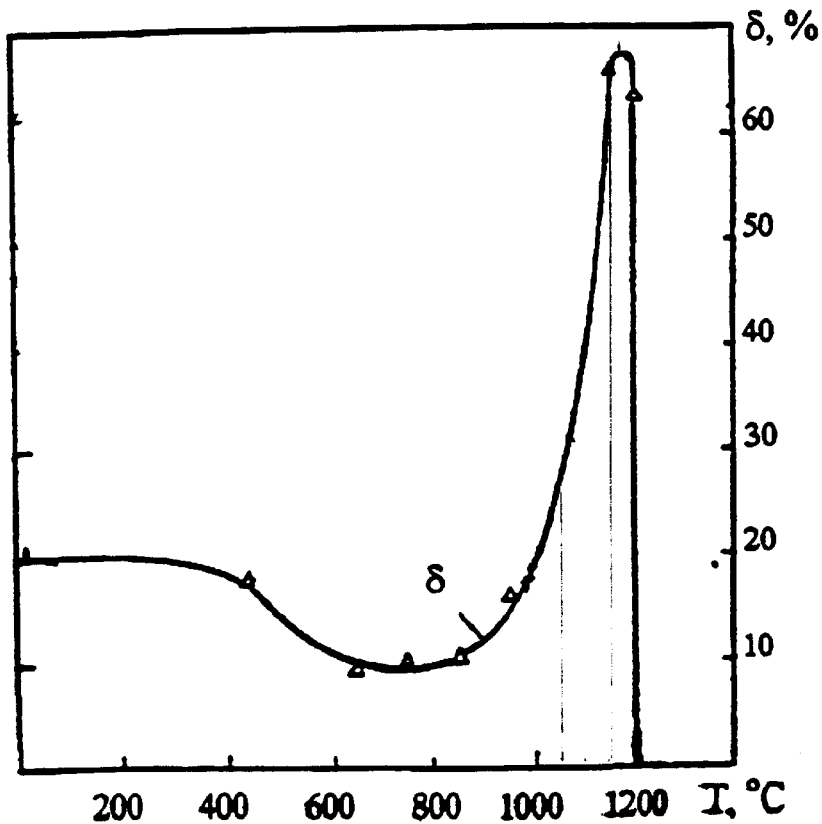
FIG. 3 is hot tensile data showing ductility ($\delta$) versus temperature for Rene 80.

The superalloy article (e.g. a vane or blade) is preheated, preferably using an induction heating coil. During this preheating stage the entire weld area of the superalloy article and region adjacent to the weld area is heated by the induction heating coil to a maximum ductility temperature range. The maximum ductility temperature range is the temperature range at which a particular alloy possesses maximum ductility and is above the aging temperature, but below the incipient melting temperature. The maximum ductility temperature range is determined for each given alloy by evaluating hot tensile test data and is a temperature range at which the ductility of the alloy is significantly increased over the alloy's ductility at ambient temperatures. That data may be measured using "Gleeble" type test equipment as manufactured by Dynamic Systems Inc., as outlined in the paper "Evaluation of the Weldability of the Gas Turbine Blade Materials In738LC and Rene 80" authored by N. Czech et al. (Proceedings from Materials Solutions '97 on Joining and Repair of Gas Turbine Components, Sept. 15–18, 1997, pages 7–10). Critical to the process is that the part temperature is closely controlled at this temperature range during the weld process. In FIG. 2 the hot tensile data for In738LC shows a maximum ductility temperature range for the alloy of from 1800° F. to 1900° F. (980 to 1040° C.) and in FIG. 3 the data shows Rene 80 with a maximum ductility temperature range of from 1925 to 2100° F. (1050 to 1150° C.). The data for FIGS. 2 and 3 is taken from the N. Czech et al. article. As the hot tensile data demonstrates in FIGS. 2 and 3 the ductility of the alloys is significantly reduced at temperatures below or above this optimum range. The maximum ductility temperature range will generally be found within the range of 1400° F. to 2100° F. (760 to 1150° C.).

Critical to this process is to maintain thermal equilibrium before, during and after the welding/cladding process, leading to less severe thermal gradients across the weld/adjacent base metal thus reducing residual stresses and subsequent cracking. The reduction of thermal gradients lessens the impact of the heat from welding on the heat affected zone, i.e. the process "relocates" the heat affected zone away from the fusion line. Since the entire weld area and adjacent region is preheated above the precipitation hardening temperature, this results in a uniform thermal distribution that precludes the contraction and resultant residual stresses that are normally focused at the weaker heat affected zone. The entire weld area and adjacent region undergoes thermal contraction as a result of the aging reaction with the residual stresses that result from this reaction being distributed over a much larger area, not only concentrated in the spot being welded.

The entire weld area and region adjacent to the weld are heated, by induction heating, to the ductile temperature. The region adjacent to the weld area being heated is at least sufficiently large to be able to encompass the heat affected zone, preferably larger. The heat affected zone is defined as that portion of the base metal which has not been melted, but whose mechanical properties or microstructure have been altered by the heat of welding (see Metals Handbook Ninth Edition, Volume 6, ASM, 1983). Generally this adjacent region being heated is at least 0.25 inches preferably 0.5 to 1 inch from the weld.

Once the article has been preheated to the desired temperature the laser and powder feed are engaged for welding. The radiation from the laser forms a small molten pool of the substrate as the powder from the powder feed is dispersed over the molten pool and welded (clad) to the part by the laser beam. The solidification process is precisely controlled by the radiation of the beam and the heating energy imparted by the induction coil and relative movement of the beam and the article to control the thermal and resulting strains and stresses to form a crack-free weld during and after the solidification process. During operation, the article weld area is shrouded in an inert gas (e.g. argon or helium) in order to minimize the oxidation and oxide contamination of the base superalloy and filler metal alloy powder during the heating and welding process.

The temperature of the weld area is controlled throughout the process in spite of added heat from the laser beam by using an optical pyrometer with feedback voltage loop (inferometer) controlling the induction heater. The part is preheated in the maximum ductility temperature range and remains in this range during welding and solidification despite localized welding heat input. In addition, the inferometer (feedback loop) controls the ramp up (heat up) rate prior to welding and the ramp down (cool down) once welding has been completed. This preheating process reduces stresses and cracking from welding and allows the base superalloy article to be laser welded (clad) with a powder alloy feed which also comprises a superalloy, i.e. a gamma-prime precipitation strengthened superalloy. Advantageously a powder alloy can be utilized which is substantially the same as the alloy of the superalloy article. The reduction of stresses and cracking therefrom is especially needed when welding a directionally solidified superalloy with a gamma prime strengthened alloy due to the susceptibility for cracking along grain boundaries.

After the weld process is completed but prior to cooling, the weld area is heated to a temperature high enough to allow a full stress relief to take place. The stress relief temperature is typically in the range of 1900° F. to 2100° F. (1040 to 1150° C.), determined for the specific alloy. The weld area is held at the higher temperature for a period of time sufficient for all residual weld stresses to dissipate.

The cooling is controlled to reduce stresses induced by uncontrolled cooling which can induce cracking. After completing the high temperature stress relief the weld area is rapidly cooled to a temperature below the gamma prime precipitation hardening range, typically 1500° F. to 1650° F. (815 to 900° C.). The rapid cool minimizes and/or prevents additional gamma prime precipitation, which would add additional stress to the weld area. Typically the cooling is at a rate of at least 100° F. per minute (at least 55° C. per minute), preferably at least 116° F. per minute (46° C. per minute).

The cooling rate to prevent additional gamma prime precipitation can be determined experimentally for each type of alloy by plotting a time-temperature-transformation curve. A number of identical material samples are required, with each sample in the solution heat treated condition. Typically, solution heat treat temperatures are in the range of 2200–2300° F. To prepare the samples, the sample is held at the solutioning temperature for the time specified by the manufacturer. To generate the time-temperature-transformation cure, each sample must then be quenched in argon to an intermediate temperature, typically between 1400–2000° F. The samples are held at that temperature for a set amount of time before being quenched to room temperature. A large number of samples are processed per this procedure using different intermediate temperatures and holding times to create a "map" for each alloy. After completing the heat treatments, each sample is metallurgically evaluated for the presence of gamma prime. The information is transferred to a plot of temperature vs. time, where the time-temperature-transformation curve is drawn as the boundary between areas on the plot that show gamma prime and those that do not. The time-temperature-transformation curve is used to determine the critical cooling rate for each alloy which is required to keep the alloy out of the range where gamma prime precipitation occurs to prevent the stresses associated with additional gamma prime precipitation, which can cause cracking in the alloy.

Figure 1:
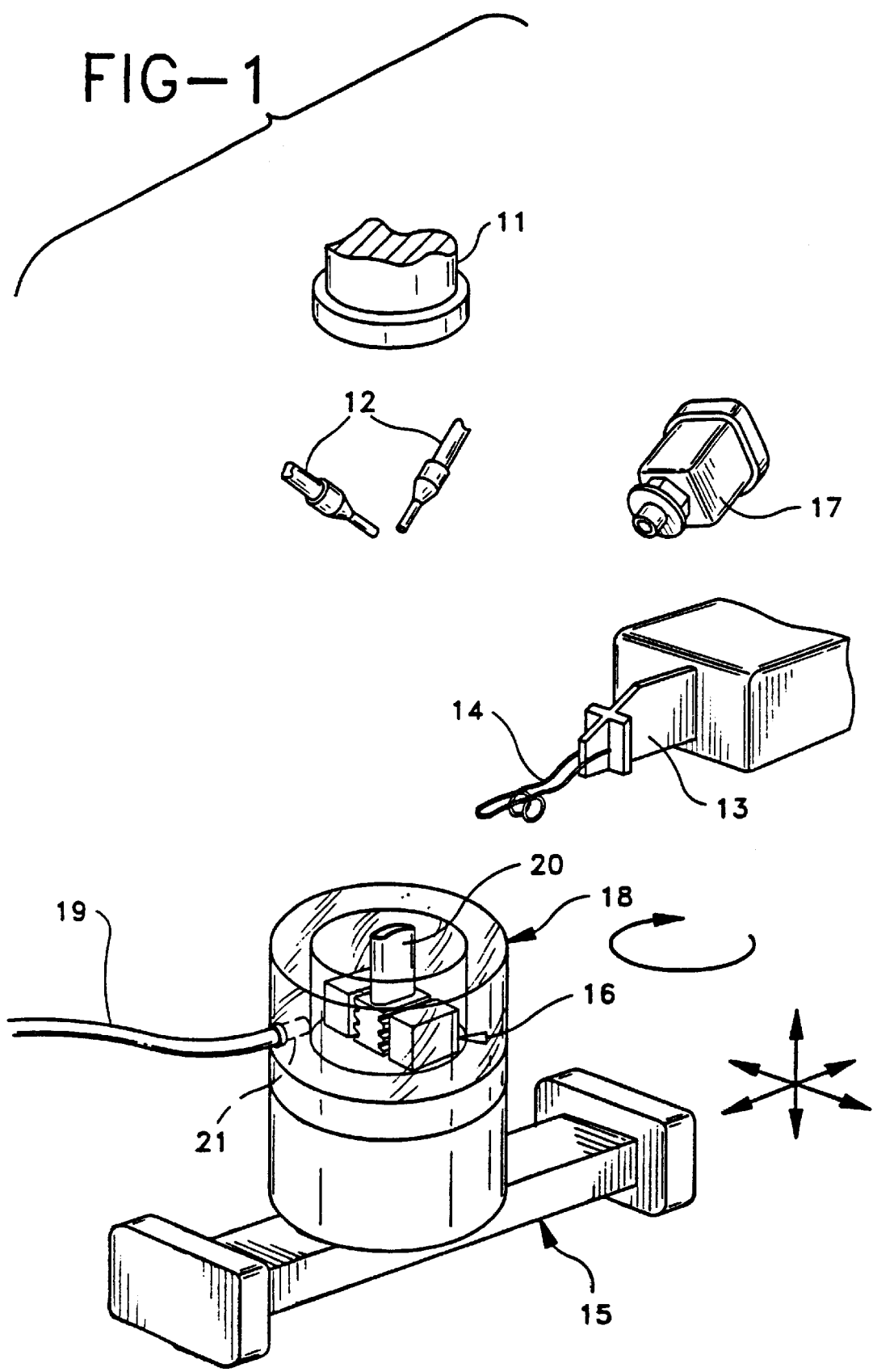
FIG. 1 illustrates a laser welding system useful for carrying out the laser welding process.

FIG. 1 illustrates a laser welding system useful for carrying out the invention in which the components are not engaged, the apparatus is comprised of a laser 11 with a powder feed 12, an induction heater 13 with its induction heating coil 14 and a motion system 15 on which the article 20 is fixtured. The article (a turbine blade is shown) is fixtured by mounting on a stage 16 in a very precise manner utilizing a clamp, as is conventional. A pyrometer 17 and an inert gas shroud (shield) 18 with an inert gas feed line 19 and gas diffuser 21 are also shown.

The laser welding of the article is controlled through use of a computer numerical control (CNC) means which controls the laser, powder feed and motion system on which the article is fixtured. Extensive programming and parameter development corroborated by metallurgical analysis is required for a metallurgically sound fusion bond without cracks. The control means includes a vision system which digitizes the article configuration in order to drive the motion system holding the article beneath the focused laser beam and converged powder feed.

The control system permits efficient and economical operation of the process allowing a variety of complex configuration to be welded. The vision system which is employed sets a precise path for the laser welding system which is individualized for the weld area of the particular article being welded. This is accomplished with a computer numerical control utilizing a program for the article, but with the precise path set by the vision system. After the article is secured in its fixture, the height is checked to ascertain the build-up needed during welding (cladding). Then after setting the contrast of the weld area, the camera of the vision system views (i.e. takes a picture of) the weld area and digitizes its periphery by tracing the periphery with a plurality of points which are numerically converted providing a precise contoured path for the laser to follow for the specific weld area of the article. After the path is set, the article still in its fixture, is then placed onto the motion system of the laser welding apparatus wherein the path of the laser is precisely set for this article. Because the path is precisely set for the specific article, less waste occurs in the welding process and reduced machining (e.g. milling, grinding) is required subsequent thereto to remove excess weldment. As a particular advantage subsequent machining can also be precisely controlled by utilizing the same fixture and control parameters for the specific article as originally set by the vision system for the laser welding. This reduces requirements for subsequent measurement and control which increases the efficiency of the process.

The motion system whose path is set by the control system is at least a 3-axis, preferably a 4 or 5-axis motion system to provide the detailed motion required for various complex welding area surfaces. The 3-axis motion would be along the X, Y and Z directions, the 4-axis motion for more complex flat surfaces would combine X, Y and Z directions with rotation (see FIG. 1), while a 5-axis motion for contoured surfaces would combine X, Y and Z directions with rotation and tilt.

Suitable lasers include those known to those skilled in the art including a $CO_2$ laser. The power density of the laser may be between $10^5$ watts/in$^2$ and $10^7$ watts/in$^2$ with a beam spot size in the range of 0.040 to 0.150 inches. The powder alloy feed is operated to deliver a stream of alloy particles generally −120 to +400 mesh at a rate of 5 to 15 grams/min. With the laser weld speeds of less than 10 inches per minute, preferably 2 to 4 inches per minute the laser power utilized is from $10^4$ to $10^6$ watts/in$^2$, and the powder alloy feed rate is from 2 to 6 grams per minute.

EXAMPLE 1

A second stage high pressure turbine blade was processed for repair. The blade was cast from Inconel 738LC alloy. The external coatings were chemically removed and the internal cavities were cleaned. The blade was sent through a typical vacuum pre-weld stress relief cycle. Eroded material was ground from the tip of the blade, leaving a clean flat surface. The exposed internal cavities at the blade tip were cleaned and polished using carbide burrs in manual die grinders, along with the periphery of the area to be welded. The blade was placed in a purge box so that it could be completely immersed in a protective argon atmosphere. An induction heating coil was placed around the blade tip. Based on published data, the optimum weld preheat range for Inconel 738LC was determined to be in the range from 1800° F. to 1900° F. (980 to 1040° C.). Temperatures above or below this range would significantly decrease the ductility of the alloy. The set point for the sample blade was 1850° F.+/−25° F. (1010°+/−15° C.). The blade tip was heated to 1850° F. (1010° C.), and allowed to stabilize at that temperature. The blade tip was then manually TIG welded using Inconel 738LC rod. After the welding was completed the blade tip temperature was raised to 2025° F. (1107° C.), a temperature sufficient to allow a full stress relief of the weld and adjacent areas. The blade tip was held at the 2025° F. (1107° C.) temperature for 15 minutes. The blade tip was then allowed to cool to room temperature. The initial cooldown from 2025° F. (1107° C.) to 1200° F. (650° C.) was accomplished in approximately 6 minutes. The blade tip contour was then restored via interactive laser welding with induction preheat. A final post weld vacuum heat treatment was performed. Fluorescent penetrant inspection of the weld and adjacent areas was performed, along with x-ray inspection of the blade tip. The blade tip was then sectioned for metallurgical analysis. No cracking in the weld or base alloy was found during any of the inspection operations.

EXAMPLE 2

A first stage high pressure turbine blade was processed for repair. The blade was cast from Inconel 738LC alloy. The external coatings were chemically removed and internal cavities were cleaned. The blade was sent through a typical vacuum pre-weld stress relief cycle. Eroded material was ground from the tip of the blade, leaving a clean flat surface. Thermal fatigue cracks on the airfoil walls at the blade tip were notched. Fluorescent penetrant inspection of the notched areas was performed to ensure that the cracks had been removed. The notched areas were cleaned using carbide burrs with manual die grinders to prepare for weld. The blade was then placed in a purge box to that it could be completely immersed in a protective argon atmosphere. An induction heating coil was placed around the blade tip. Based on published data, the optimum weld preheat range for Inconel 738LC was determined to be in the range from 1800° F. to 1900° F. (980 to 1040° C.). Temperatures above or below this range would significantly decrease the ductility of the alloy. The set point for the sample blade was 1850° F.+/−25° F. (1010+/−15° C.) . The blade tip was heated to 1850° F. (1010° C.) , and allowed to stabilize at that temperature. The blade tip was then manually TIG welded using, Inconel 738LC rod. After the welding was completed the blade tip temperature was raised to 2025° F. (1107° C.), a temperature sufficient to allow a full stress relief of the weld and adjacent areas. The blade tip was held at the 2025° F. (1107° C.) temperature for 15 minutes. The blade tip was then allowed to cool to room temperature. The initial cooldown from 2025° F. (1107° C.) to 1200° F. (650° C.) was accomplished in approximately 6 minutes. The blade tip contour was then restored via interactive laser welding with induction preheat, followed by a typical vacuum postweld stress relieve cycle. Fluorescent penetrant inspection of the weld and adjacent areas was performed, along with x-ray inspection of the blade tip. The blade tip was then sectioned for metallurgical analysis. No cracking in the weld or base alloy was found during any of the inspection operations.

What is claimed is:

1. A process for welding a nickel and/or cobalt based superalloy article comprising:
    preheating an entire weld area and region adjacent to the weld area of the article to a maximum ductility temperature range which is above an aging temperature and below an incipient melting temperature for said superalloy and maintaining such temperature during welding and solidification of a weld; raising the temperature of the welded article to a stress relieving temperature; and cooling the article to below the gamma prime precipitation hardening range at a rate effective to minimize additional gamma prime precipitation.

2. Process of claim 1 wherein the superalloy article is chosen from the group consisting of a gamma-prime precipitation strengthened superalloy containing titanium and aluminum in a combined amount of at least 5%.

3. Process of claim 2 wherein the article is cooled at a rate of at least 100° F. per minute.

4. Process of claim 3 wherein the maximum ductility temperature range is within the range of 1400° F. to 2100° F.

5. Process of claim 4 wherein welding is carried out with a powder alloy which is a gamma-prime precipitation-strengthened nickel base superalloy containing titanium and aluminum in a combined amount of at least 5%.

6. Process of claim 5 wherein the superalloy article and the powder alloy comprise substantially the same alloy.

7. Process of claim 6 wherein the superalloy article is a component for a gas turbine engine.

8. Process of claim 7 wherein the article is a turbine blade, turbine vane or turbine rotor.

9. Process of claim 8 further comprising machining the welded article.

10. Process of claim 5 wherein the article is cooled at a rate of at least 116° F. per minute.

11. Process of claim 10 wherein the superalloy is In 738LC and the maximum ductility temperature range is from 1800° to 1900° F.

12. Process of claim 10 wherein the superalloy is R'80 and the maximum ductility temperature range is from 1925 to 2100° F.

* * * * *